(12) United States Patent
Uhler et al.

(10) Patent No.: US 7,585,226 B2
(45) Date of Patent: Sep. 8, 2009

(54) TORSIONAL VIBRATION DAMPING DISK AND METHOD FOR THE PRODUCTION THEREOF

(75) Inventors: Adam Uhler, Sterling, OH (US); Todd Sturgin, Shreve, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 424 days.

(21) Appl. No.: 11/450,192

(22) Filed: Jun. 9, 2006

(65) Prior Publication Data

US 2006/0288815 A1 Dec. 28, 2006

Related U.S. Application Data

(60) Provisional application No. 60/689,456, filed on Jun. 10, 2005.

(51) Int. Cl.
*F16F 15/121* (2006.01)
*B23P 11/00* (2006.01)

(52) U.S. Cl. .................... 464/67.1; 192/205; 29/509
(58) Field of Classification Search ............... 464/68.9, 464/67.1; 192/3.29, 55.61, 205, 212; 29/509, 29/896.93, 889.5
See application file for complete search history.

(56) References Cited

U.S. PATENT DOCUMENTS

| 4,903,803 | A | * | 2/1990 | Koshimo | ............... 192/3.28 |
| 5,186,293 | A | * | 2/1993 | Fujimoto | ............... 192/3.28 |
| 6,675,457 | B1 | * | 1/2004 | Redmond et al. | ............. 29/509 |

* cited by examiner

*Primary Examiner*—Greg Binda
*Assistant Examiner*—Clifford J Louden
(74) *Attorney, Agent, or Firm*—Simpson & Simpson, PLLC

(57) ABSTRACT

A torsional vibration damping disk having receiving spaces for spring elements, particularly for bow spring elements, which are each arranged between two limit stop areas in the peripheral direction. In order to create a torsional vibration damping disk, which is producible easily and cost-effectively, the spring elements are each clamped with a slight pretension between two limit stop areas.

8 Claims, 4 Drawing Sheets

TORSIONAL VIBRATION DAMPING DISK AND METHOD FOR THE PRODUCTION THEREOF

CROSS REFERENCE TO RELATED APPLICATIONS

This patent application claims the benefit under 35 U.S.C. §119(e) of U.S. Provisional Application No. 60/689,456, filed Jun. 10, 2005, which application is incorporated herein by reference.

FIELD OF THE INVENTION

The invention relates to a torsional vibration damping disk comprising receiving spaces for spring elements, particularly for bow spring elements, which are each arranged between two limit stop areas in the peripheral direction. The invention also relates to a hydrodynamic torque converter comprising the torsional vibration damping disk described at the onset. The invention further relates to a method for the production of said torsional vibration damping disk described at the onset.

BACKGROUND OF THE INVENTION

A torsional vibration damping disk having receiving spaces for bow spring elements, which are each arranged between two limit stop areas in the peripheral direction is known from U.S. Pat. No. 6,675,457. In the production of the known torsional vibration damping disk, the spring elements are inserted into the preformed receiving spaces. After the insertion of the spring elements, the sheet metal material delimiting the receiving spaces is further deformed around the spring elements in a manner that prevents the spring elements from falling out of the receiving spaces.

SUMMARY OF THE INVENTION

It is the object of the invention to create a torsional vibration damping disk comprising receiving spaces for spring elements, particularly for bow spring elements, which are each arranged between two limit stop areas in the peripheral direction, wherein said torsional vibration damping disk has a simple design and can be produced cost-effectively.

The object is attained in a torsional vibration damping disk comprising receiving spaces for spring elements, particularly bow spring elements, which are each arranged between two limit stop areas in the peripheral direction by clamping each of the spring elements with a slight pretension between two limit stop areas. The slight pretension of the spring elements prevents them from falling out of the receiving spaces without causing the sheet metal material delimiting the receiving spaces from further deforming around the spring elements after the insertion of the latter.

The object of the invention is also attained in a torsional vibration damping disk comprising receiving spaces for spring elements, particularly bow spring elements, which are each arranged between two limit stop areas in the peripheral direction by deforming the torsional vibration damping disk radially inside the spring elements in at least one place in such a way that the deformed area prevents the associated spring element from falling out. The deformed area can be provided as an alternative or in addition to the pretensioning, described at the onset, of the spring elements. The associated spring element preferably rests partially against the deformed area in the installed state.

In a preferred embodiment, the torsional vibration damping disk includes a deformed area comprising a lug, which is bent out of the torsional vibration damping disk. The lug is formed, for example, by a substantially U-shaped incision into the torsional vibration damping disk.

In another preferred embodiment, the torsional vibration damping disk includes a deformed area comprising an elevation in the torsional vibration damping disk. The shape of the elevation is preferably adapted to the associated spring element.

The invention also relates to a hydrodynamic torque converter comprising the torsional vibration damping disk described at the onset.

In a method for the production of the torsional vibration damping disk described at the onset, the torsional vibration damping disk comprising receiving spaces for spring elements, particularly for bow spring elements, which are each arranged between two limit stop areas in the peripheral direction, the object specified above is attained by clamping the spring elements with a low pretension between the limit stop areas. The pretensioning of the spring elements reliably prevents them from falling out of the receiving spaces without requiring the sheet metal material delimiting the receiving spaces to be further deformed around the spring elements after the insertion of the latter.

The object specified above is also attained in a method for the production of a torsional vibration damping disk comprising receiving spaces for spring elements, particularly for bow spring elements, which are each arranged between two limit stop areas in the peripheral direction, by deforming the torsional vibration damping disk radially inside the receiving spaces for the spring elements in at least one place in such a way that the deformed area prevents a spring element arranged between the limit stop areas from falling out. In this case, the spring element need not be pretensioned. The deformation can be carried out as an alternative or in addition to the pretensioning of the spring elements described at the onset. The associated spring element preferably rests against the deformed area in the installed state.

In a preferred embodiment of the method, the torsional vibration damping disk is deformed before the insertion of the spring elements. The advantage of this is that the torsional vibration damping disk can be subjected to a heat treatment before the insertion of the spring elements. After the heat treatment the torsional vibration damping disk no longer has to be deformed.

In another preferred embodiment of the method, the torsional vibration damping disk is deformed after the insertion of the spring elements. This simplifies the insertion of the spring elements.

BRIEF DESCRIPTION OF THE DRAWINGS

Additional advantages, features, and details of the invention are specified in the following description in which different example embodiments are described in detail with reference to the drawings. The features mentioned in the claims and in the description can thereby be essential to the invention either individually or in any combination thereof. The drawing illustrates:

DETAILED DESCRIPTION OF THE INVENTION

Figure 1:
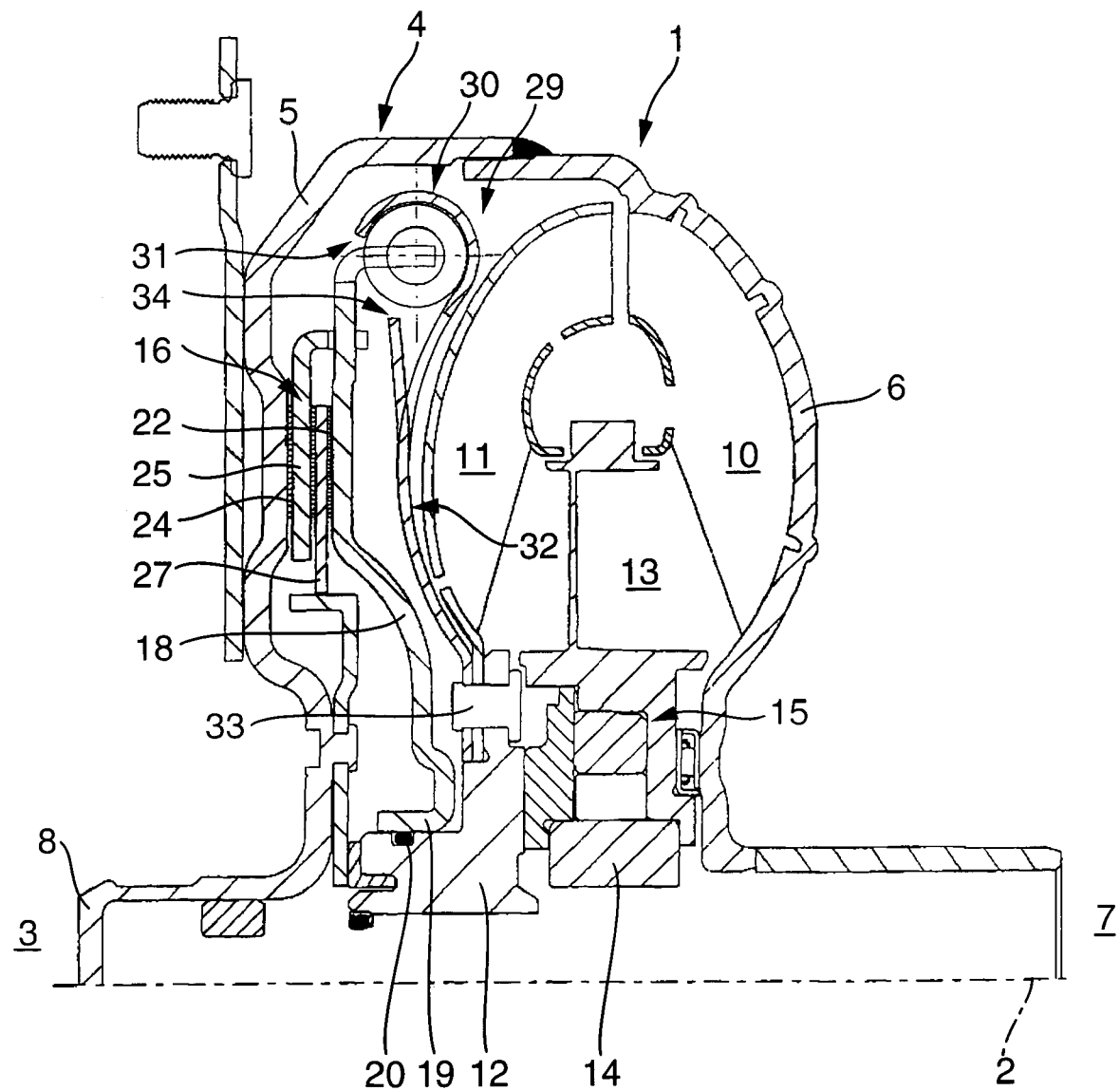
FIG. 1 illustrates the upper half of a longitudinal section of a hydrodynamic torque converter comprising an inventive torsional vibration damping disk.

FIG. 1 illustrates the upper half of a longitudinal section of hydrodynamic torque converter 1, which is arranged concentrically to rotation axis 2. Torque converter 1 is arranged in the drive train (not illustrated) of a motor vehicle between internal combustion engine 3 and automatic gearbox 7. Internal combustion engine 3 comprises a driven shaft, for example, a crankshaft, which is connected non-rotatably to housing 4 of torque converter 1. Housing 4 comprises housing wall 5 located close to the drive and housing wall 6 located far from the drive. Housing wall 5 located close to the drive is connected in its radially inner area in one piece to hub part 8, which is guided radially using an attachment in the flywheel or in the crankshaft of the internal combustion engine.

Housing wall 6 of torque converter 1, the housing wall being located far from the drive, is combined with pump wheel 10 to form one structural unit. Turbine wheel 11 is arranged between pump wheel 10 and housing wall 5 located close to the drive, wherein turbine wheel 11 is permanently connected to turbine wheel hub 12, which is arranged using a toothing on a gearbox input shaft (not illustrated). Guide wheel 13 is arranged between turbine wheel 11 and pump wheel 10, wherein the guide wheel is guided using freewheel 15 on guide wheel hub 14, which in turn is fitted using a toothing on a tube section (not illustrated), which is fixed to the housing.

Piston 18 of converter lockup clutch 16 is arranged between turbine wheel 11 and housing wall 5 located close to the drive. Piston 18 comprises radially inwards collar 19, which points away from gearbox 7 and which is supported axially displaceably on turbine wheel hub 12 and is sealed in relation to this hub by sealing 20. Towards internal combustion engine 3, which is also referred to as a drive, piston 18 comprises friction surface 22, which is arranged opposite to friction surface 24, which is provided on the side of housing wall 5 located close to the drive, the side being turned away from internal combustion engine 3. Intermediate plate 25 is arranged between friction surfaces 22 and 24, wherein the intermediate plate is non-rotatably connected to piston 18. Another intermediate plate 27 is arranged in turn between intermediate plate 25 and friction surface 22, wherein intermediate plate 27 is non-rotatably connected to housing wall 5, located close to the drive.

Piston 18 simultaneously forms the input part of torsional vibration damper 29, which is connected between piston 18 and turbine wheel 11. Torsional vibration damper 29 comprises several receiving spaces for energy storage elements. In the sectional view illustrated in FIG. 1, receiving space 30 can be seen, in which energy storage element 31 is received. An arm angled radially outwards from piston 18 towards gearbox 7 engages in energy storage element 31. Receiving space 30 is embodied in torsional vibration damping disk 32, which is fixed radially inwards with the help of riveted joints 33 to turbine wheel hub 12. Lug 34 bent out of torsional vibration damping disk 32 prevents energy storage element 31 from falling out of receiving space 30.

Figure 2:
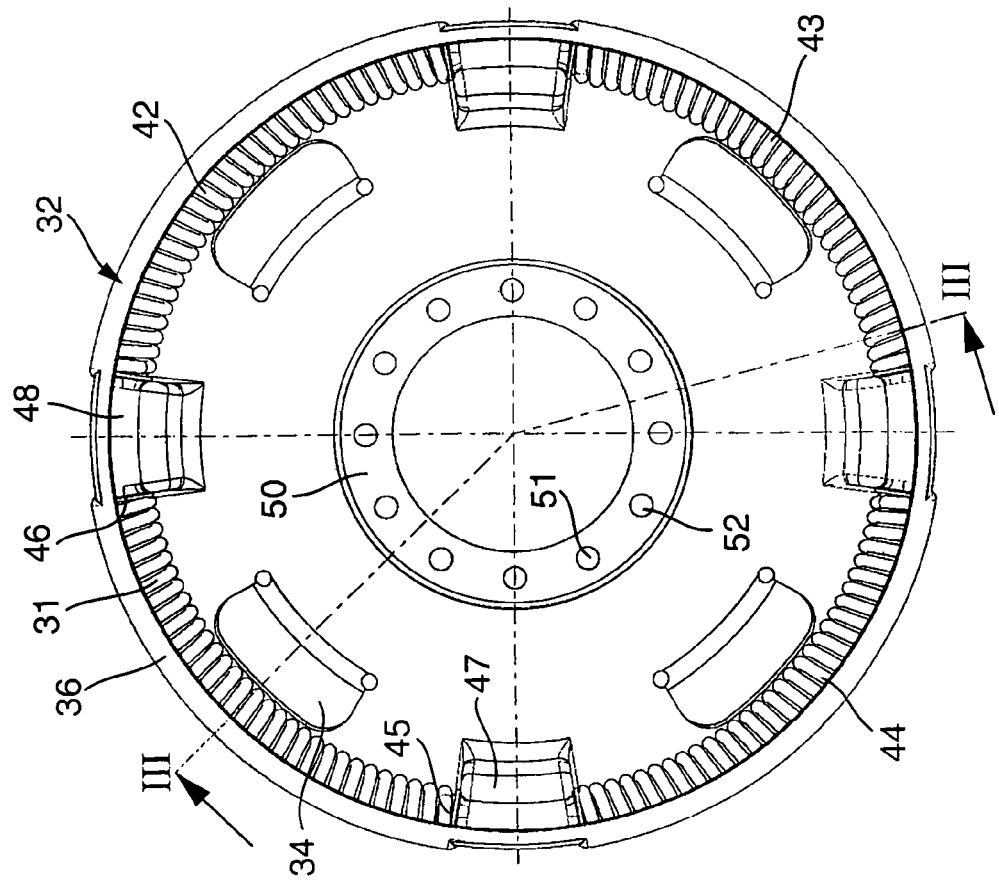
FIG. 2 illustrates the top view of the torsional vibration damping disk alone.

FIG. 2 illustrates a top view of torsional vibration damping disk 32. Torsional vibration damping disk 32 substantially has the shape of a circular disk, of which radially outer edge 36 is deflected in order to form receiving spaces for energy storage elements 31, 42, 43, and 44. The cross-section of deflected edge 36 has the shape of a circular arc, which stretches over less than 180 degrees in its peripheral direction. This enables an easy insertion of energy storage elements 31, 42 to 44.

Energy storage elements 31, 42 to 44 are curved helical compression springs, which are also referred to as bow springs. Bow springs 31, 42 to 44 are each arranged between two limit stops 45 and 46. According to one aspect of the present invention, bow spring 31 is clamped with a low pretension between limit stops 45 and 46. In a similar manner the other bow springs 42 to 44 can be clamped between the associated limit stops. Limit stops 45 and 46 are each provided on deformed areas 47, 48 of torsional vibration damping disk 32.

In its radially inner area, torsional vibration damping disk 32 comprises ring flange 50 having several throughholes 51, 52. Throughholes 51, 52 are arranged for passing riveted joints (33 in FIG. 1). As an alternative or in addition to the pretensioning of bow spring 31, lug 34 is bent out of torsional vibration damping disk 32 radially inside bow spring 31. Lug 34 is substantially formed from a C-shaped incision into torsional vibration damping disk 32.

Figure 4:
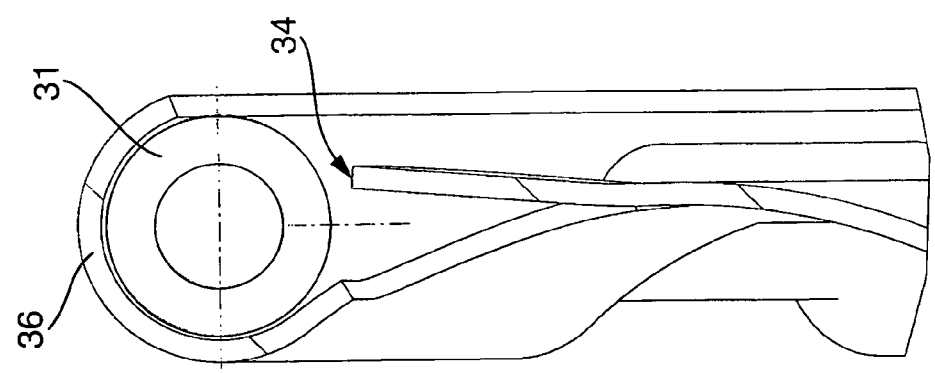
FIG. 4 is an enlarged illustration of a detail IV shown in FIG. 3.
Figure 3:
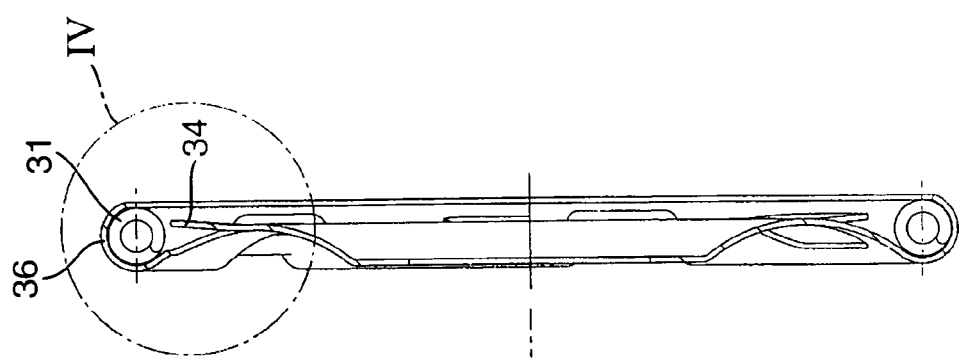
FIG. 3 illustrates the view of a section along the line III-III shown in FIG. 2.

FIG. 3 illustrates the view of a section along the line III-III shown in FIG. 2. It is apparent in the sectional view that the free end of lug 34 is arranged slightly below bow spring 31 in such a way that the latter cannot fall out of the receiving space arranged inside deflected edge 36. A detail IV shown in FIG. 3 is illustrated in an enlarged form in FIG. 4.

Figure 5:
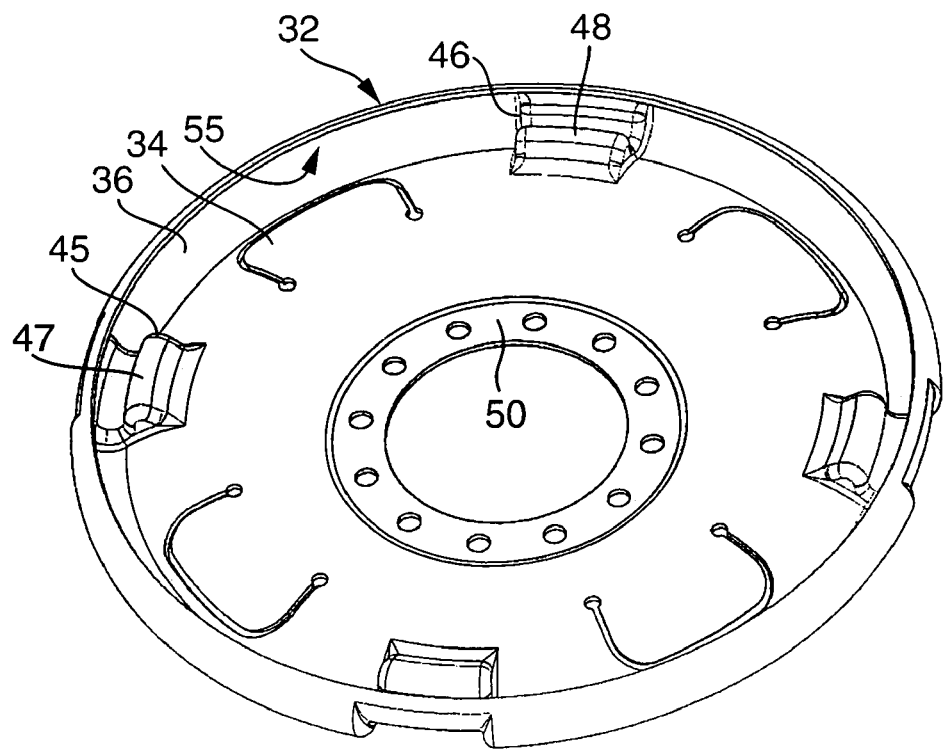
FIG. 5 is a perspective illustration of the torsional vibration damping disk before the insertion of the bow springs.

FIG. 5 is a perspective illustration of torsional vibration damping disk 32 before the insertion of the bow spring and before the deformation of the lug, of which only one lug is provided with reference numeral 34. Furthermore, the receiving spaces for the bow springs inside deflected edge 36 are jointly marked with reference numeral 55 in FIG. 5. Receiving space 55 is divided by deformed areas 47 and 48 into several receiving spaces for the individual bow springs.

Figure 6:
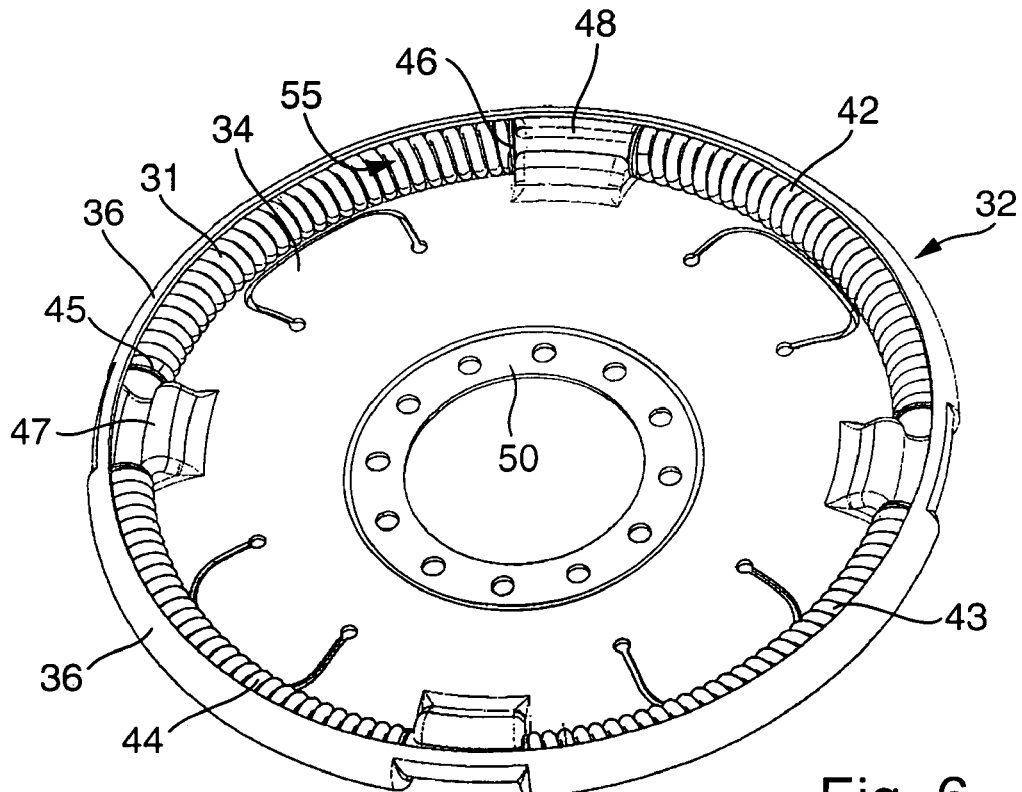
FIG. 6 illustrates the torsional vibration damping disk shown in FIG. 5 after the insertion of the bow springs.

In FIG. 6, bow springs 31, 42 to 44 are inserted into the respective receiving spaces, which are delimited radially outwards by deflected edge 36 of torsional vibration damping disk 32. However, the receiving spaces comprise an opening, of which the width is slightly larger than the outer diameter of the bow springs. This facilitates the insertion of the bow springs into the receiving spaces. However, there is the risk of the bow springs falling out of the receiving spaces when torsional vibration damping disk 32 comes to a standstill. In order to prevent this, the bow springs are preferably clamped with a slight pretension between the respective limit stops areas. Alternatively or additionally, the lugs, of which only lug 34 is provided with a reference numeral in FIG. 6, are bent out of torsional vibration damping disk 32 upwards from the plane of paper.

Figure 7:
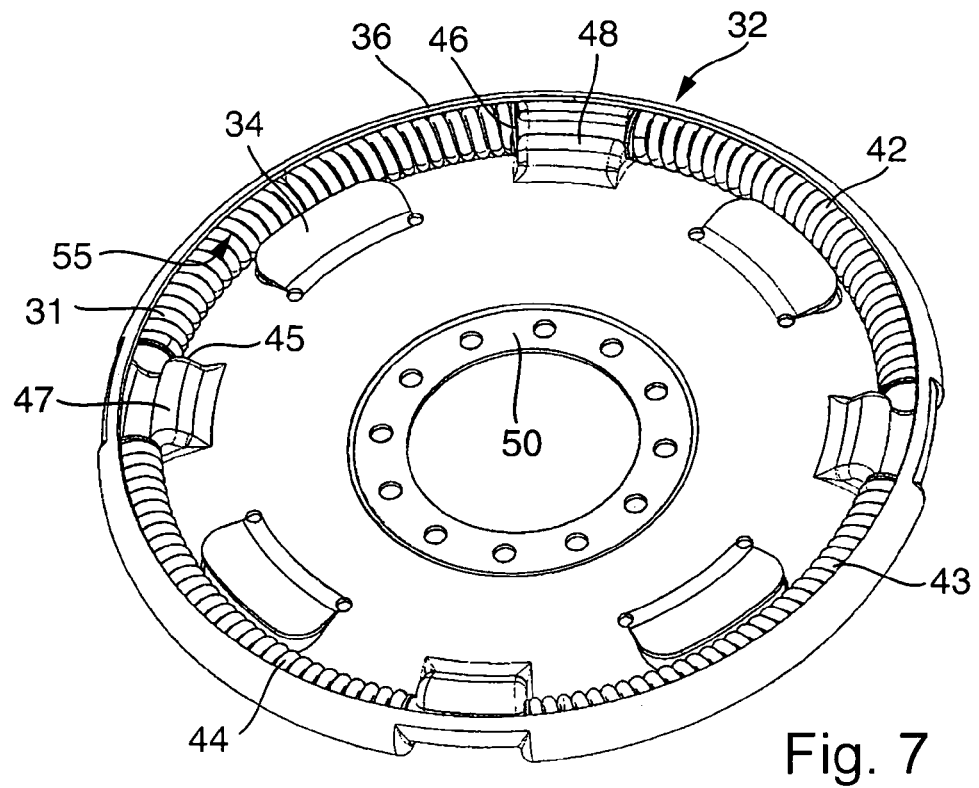
FIG. 7 illustrates the torsional vibration damping disk shown in FIG. 6 after the bending out of the lugs; and, FIG. 8 illustrates a similar torsional vibration damping disk as in FIG. 7 in accordance with another example embodiment.

Lugs 34 are illustrated in the bent-out state in FIG. 7. As is apparent, the radially outer edge of lugs 34 rests radially inwards against the bow springs and fixes the latter in the receiving spaces. This reliably prevents the bow springs from falling out of the receiving spaces.

Figure 8:
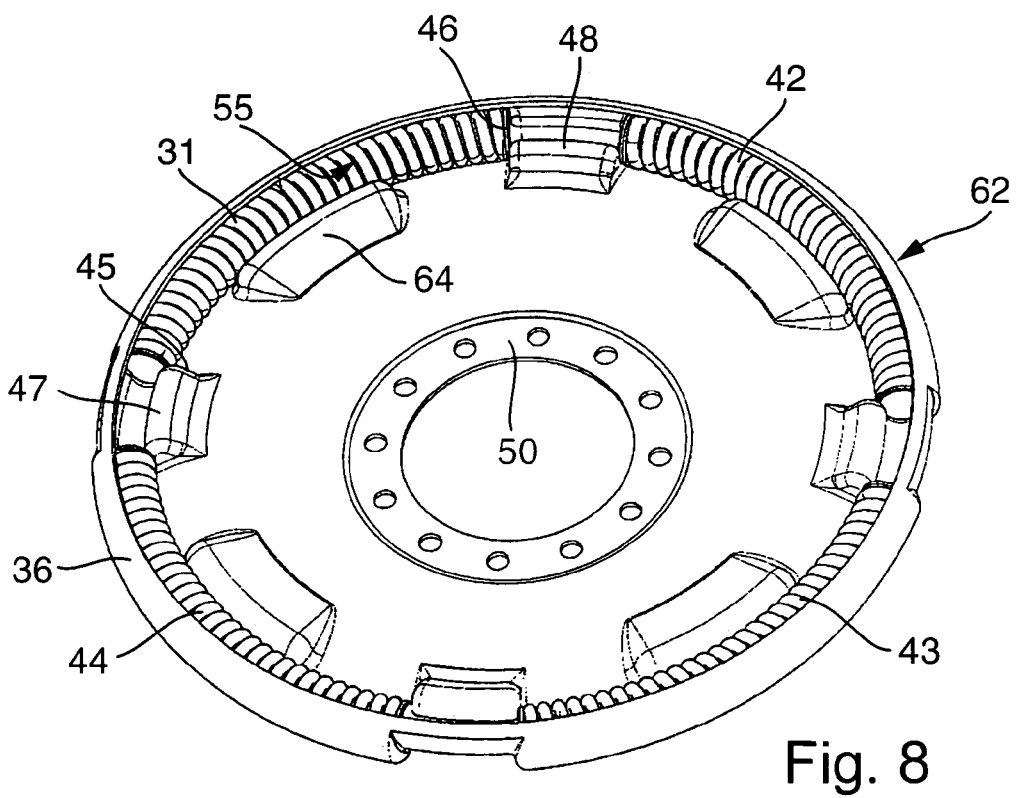

FIG. 8 is a perspective illustration of torsional vibration damping disk 62, which resembles torsional vibration damping disk 32 illustrated in FIGS. 2 to 7. Like reference numerals are used for marking like parts. With a view to avoiding repetition, reference should be made to the preceding description of FIGS. 2 to 8. In the following, only the differences between the example embodiments are taken into consideration.

In torsional vibration damping disk 62 illustrated in FIG. 8, bow springs 31, 42 to 44 are prevented radially inwards from falling out by elevations, which are pressed out of torsional vibration damping disk 62. Only one elevation 64 is provided with a reference in FIG. 8. Elevation 64 serves for the same purpose as the lug (34 in FIG. 7) in torsional vibration damping disk 32.

LIST OF REFERENCE NUMERALS

1 Torque converter
2 Rotation axis
3 Internal combustion engine
4 Housing
5 Housing wall close to the drive
6 Housing wall far from the drive
7 Gear
8 Hub part
10 Pump wheel
11 Turbine wheel
12 Turbine wheel hub
13 Guide wheel
14 Guide wheel hub
15 Freewheel
16 Converter lockup clutch
18 Piston
19 Collar on turbine wheel
20 Sealing
22 Friction surface
24 Friction surface
25 Intermediate plate
27 Intermediate plate
29 Torsional vibration damper
30 Receiving space
31 Energy storage element
32 Torsional vibration damping disk
33 Riveted joint
34 Lug
36 Deflected edge
42 Energy storage element
43 Energy storage element
44 Energy storage element
45 Limit stop
46 Limit stop
47 Deformed area
48 Deformed area
50 Flange
51 Through hole
52 Through hole
55 Receiving area
62 Torsional vibration damping disk
64 Elevation

What is claimed is:

1. A torsional vibration damping disk comprising a radially outer edge having an arc-shaped cross-section defining receiving spaces for spring elements (31, 42-44), a plurality of limit stop areas about said radially outer edge, said spring elements each arranged between two of said limit stop areas (45, 46) in the peripheral direction, said torsional vibration damping disk operatively arranged such that said spring elements (31, 42-44) are each clamped with a pretension between each of said two limit stop areas (45, 46), and lugs corresponding to said receiving spaces, said lugs deformed from said damping disk, with one lug directed toward each of said receiving spaces for retaining each of said spring elements in said receiving spaces, wherein said radially outer edge, said limit stops, and said lugs are formed integrally from said torsional vibration damping disk.

2. A hydrodynamic torque converter comprising a housing which contains a pump wheel, a turbine wheel coupled to said pump wheel for transferring hydrodynamic power between a torque converter input and a torque converter output, and a torsional damper, wherein said torsional damper includes a torsional vibration damping disk (32; 62) according to claim 1, and wherein said torsional vibration damping disk is secured between said turbine wheel and a piston of said torque converter, wherein said piston is an input for said torsional damper.

3. The torsional vibration damping disk recited in claim 1, wherein each of said lugs is deformed from said torsional vibration damping disk radially inside of said receiving spaces.

4. The torsional vibration damping disk according to claim 1, wherein each lug obstructs a portion of one of said spring elements less than a length of said one of said spring elements as arranged between said two limit stops.

5. The torsional vibration damping disk according to claim 1, wherein said radially outer edge of said torsional vibration damping disk is operatively shaped to engage less than 180 degrees peripherally about said spring elements.

6. A method for the production of a torsional vibration damping disk (32; 62), comprising the steps of:
    (a) deforming a radially outer edge of said torsional vibration damping disk to form an arc-shaped cross-section for said radially outer edge, wherein said arc-shaped cross-section defines receiving spaces for spring elements (31, 42-44);
    (b) forming limit stop areas about said radially outer edge located between each receiving space by deforming said damping disk, wherein each receiving area is bounded by a pair of limit top areas;
    (c) inserting one of said spring elements in each receiving space, wherein each spring element is arranged between one of said pairs of limit stop areas (45, 46) in the peripheral direction, wherein each of the spring elements (31, 42-44) is clamped with a pretension between each pair of the limit stop areas (45, 46); and,
    (d) forming lugs proximate to each of said receiving spaces by deforming said vibration damping disk radially inside said receiving spaces and wherein one of said lugs is directed towards each of said receiving spaces and prevents each of said spring elements from falling out of said receiving spaces.

7. The method according to claim 6, wherein the said lugs are deformed in step (d) before the spring elements (31, 42-44) are inserted in step (c).

8. The method according to claim 6, wherein said lugs are deformed after the spring elements (31, 42-44) are inserted in step (c).

* * * * *